(12) United States Patent
Bracke (10) Patent No.: US 8,231,817 B2
(45) Date of Patent: Jul. 31, 2012

(54) PROCESS FOR THE PRODUCTION OF A THREE-DIMENSIONALLY SHAPED SANDWICH STRUCTURE

(75) Inventor: Kristiaan Bracke, Berlare (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 446 days.

(21) Appl. No.: 12/281,239

(22) PCT Filed: Mar. 7, 2007

(86) PCT No.: PCT/EP2007/052146
§ 371 (c)(1),
(2), (4) Date: Aug. 29, 2008

(87) PCT Pub. No.: WO2007/101868
PCT Pub. Date: Sep. 13, 2007

(65) Prior Publication Data
US 2009/0072441 A1    Mar. 19, 2009

(30) Foreign Application Priority Data

Mar. 8, 2006 (EP) .................................... 06110859

(51) Int. Cl.
*B29C 43/18* (2006.01)
(52) U.S. Cl. .................................... 264/271.1; 264/320
(58) Field of Classification Search .............. 264/271.1, 264/320, 279, 322, 241, 259, 296, 294
See application file for complete search history.

(56) References Cited

U.S. PATENT DOCUMENTS 3,115,678 A   12/1963  Keen et al.
4,119,451 A   10/1978  Fujii
4,690,666 A    9/1987  Alexander et al.
5,151,277 A    9/1992  Bernardon et al.
5,824,255 A   10/1998  Ross et al.
6,596,124 B2   7/2003  Hookham et al.
6,800,351 B1  10/2004  Pflug et al.
2001/0045684 A1 11/2001 Blanchon

FOREIGN PATENT DOCUMENTS

DE       4233139 A1   7/1994
(Continued)

*Primary Examiner* — Christina Johnson
*Assistant Examiner* — Xue Liu
(74) *Attorney, Agent, or Firm* — Sughrue Mion, PLLC (57) ABSTRACT

The three-dimensionally shaped sandwich structure is produced starting from a layered material (1) comprising a compressible core layer, in particular a paper honeycomb structure, having two opposite main faces which are each covered with a reinforcing material and with a mouldable material. The layered material (1) is moulded in a compression mould comprising two mutually movable mould sections (7, 9). In order to reduce the formation of cracks, tears or breaks in the core layer, the first mould section (7) is composed of at least two mutually movable mould parts (10 and 11-12). A first portion of the layered material (1) is first deep-drawn by moving the first mould part (10) towards its moulding position so that wrinkles are formed in the layered material and the second mould part (11-12) is moved later and/or more slowly than the first mould part (10) towards its moulding position. In this way the formation of wrinkles by the first mould part (10) is enhanced due to the fact that the layered material (1) is little or not hampered from being drawn by the first mould part to the deep-drawn area. The second mould part may be composed of different subparts (11-13) which are also moved successively towards their moulding position.

21 Claims, 4 Drawing Sheets

FOREIGN PATENT DOCUMENTS

| | | |
|---|---|---|
| EP | 370991 A2 * | 5/1990 |
| EP | 1211051 A2 | 6/2002 |
| GB | 1554077 | 10/1979 |
| JP | 62-142628 A | 6/1987 |
| JP | 04-308732 A | 10/1992 |
| WO | 02/09977 A1 | 2/2002 |
| WO | 02/26461 A2 | 4/2002 |
| WO | 2005/021230 A1 | 3/2005 |

* cited by examiner

PROCESS FOR THE PRODUCTION OF A THREE-DIMENSIONALLY SHAPED SANDWICH STRUCTURE

BACKGROUND OF THE INVENTION

The present invention relates to a process for the production of a three-dimensionally shaped sandwich structure comprising the steps of providing at least a core layer for the sandwich structure which comprises a compressible core material; positioning said core layer in a compression mould between a first and a second mould surface thereof, the first mould surface being formed by a first mould section and the second mould surface by a second mould section, the first and second mould sections being movable with respect to one another between a moulding and a demoulding position; and bringing the mould sections into their moulding position to mould said core layer into a three-dimensional shape between the first and the second mould surfaces; the core layer having two opposite main faces which are covered before and/or after the moulding step with at least one layer of a covering material to achieve said sandwich structure.

The compressible core layer is intended to keep the covering material during the moulding process near the surface of the sandwich structure so that a lightweight sandwich structure with good mechanical properties can be obtained. Due to their relatively low weight, sandwich structures are especially advantageous for use in vehicles such as cars, ships, planes. They can in particular be used as substrate layer for wall coverings such as door or roof trim parts. In practice, the compressible core layer is usually made of a non-elastic or non-stretchable material which lacks ductility such as corrugated paperboard or a honeycomb material. An important drawback of the presence of such non-elastic or non-stretchable core materials in the sandwich structures is that they are difficult to be moulded into complex, three-dimensional shapes. This problem has already been treated in a number of patent publications.

U.S. Pat. No. 4,119,451 discloses for example a method for manufacturing an automobile roof trim board comprising a corrugated paperboard as substrate and a skin or facing layer fixed thereto. The problem addressed in this patent is that during the press-forming of the corrugated paperboard cracks will occur therein at the location of the deep-drawn areas. These cracks reduce the strength of the trim board and may even be seen through the covering layer which is applied onto the moulded paperboard. To prevent or reduce the formation of such cracks, U.S. Pat. No. 4,119,451 teaches to make, prior to the press-forming process, notches in the corrugated paperboard at the location of the deep-drawn areas. However, it is clear that this solution can only be used in certain areas, more particularly in areas wherein holes will be cut out later for example to receive a room lamp. Moreover, it is not applicable to complexly shaped trim boards or portions thereof wherein no holes have to be cut.

Another solution for reducing the formation of cracks when press-forming corrugated paperboard as substrate for automobile roof trim or door trim boards is disclosed in GB 1 554 077. This solution consists in that the corrugated paperboard is moistened by means of water or steam prior to the press-forming step. A similar method is disclosed in U.S. Pat. No. 6,596,124 for a cellulose based paper honeycomb structure. In this method the honeycomb structure is immersed in water for several minutes to a few hours until it is flexible enough to be moulded into the desired shape. A drawback of this method is that, especially for complex shapes, a relatively long drying period is required to dry the honeycomb structure before the covering layers can be applied and secondly, that for complex shapes vacuum needs to be applied during moulding. A further drawback is that a mould made of a metal mesh material is needed in order to allow hot air to pass through the cells to dry the paper honeycomb material. Covering layers can thus not be moulded directly onto the honeycomb structure in the compression mould, but need to be applied afterwards. The presence of such covering layers would indeed prevent or hamper at least the drying of the core material and it is not possible to mould the cover layers against a mould surface made of an open mesh material. Moistening methods as described in GB 1 554 077 and U.S. Pat. No. 6,596,124 generally improve the ductility of the core material so that it can be shaped to some extent, more particularly to two-dimensionally curved planes, but they are insufficient to improve the ductility of the core material to such an extent that it can be moulded into complex, three dimensional shapes without cracking or rupture problems or loss of mechanical properties. Furthermore, according to U.S. Pat. No. 6,596,124, paper-based core materials need to be pretreated with a resin coating prior to the forming process in order to allow the core material to take up the required amount of moisture without reducing the mechanical properties of the core material too much.

Other methods for reducing cracks when moulding or shaping honeycomb core materials are disclosed in U.S. Pat. No. 5,824,255 and in DE-A-42 33 139. In these methods the sheets of honeycomb material are only curved two-dimensionally. During the curving step, the honeycomb material is supported by a carrier sheet or plate which is curved simultaneously with the honeycomb material to reduce the formation of cracks therein. A drawback of these methods is that they are only applicable for relatively simple shapes. The required three-dimensionally shaped structures are often required to meet the demand of a high design freedom for the production of for instance vehicle interior parts, such as headliners, instrument panels, door panels, etc. Such vehicle interior parts can be produced for instance by spraying a skin on a mould and uniting this skin to a structural carrier or substrate layer by means of an intermediate foam layer. Reference is for instance made to WO 02/09977; WO 02/26461 and WO 05/021230. Substrate layers are mostly made of plastics or reinforced plastics such as PU, PP, ABS, PE, ABS/PC and PC. As there is a need for more lightweight substrate materials, one has to take into account the mouldabilty of these materials, in order to make them usable as for instance substrate materials for vehicle trim parts.

SUMMARY OF THE INVENTION

An object of the present invention is to provide a new process for the production of a three-dimensionally shaped sandwich structure which enables to reduce the formation of cracks, tears or breaks in the core layer when moulding complex three-dimensional shapes so that better mechanical properties can be achieved in the deep-drawn area or areas of the sandwich structure.

To this end the process according to the present invention is characterised in that at least said first mould section is composed of at least two mutually movable mould parts, including at least a first and a second mould part forming respectively a first and a second portion of said first mould surface, and in that, when bringing the mould sections into their moulding position, a first portion of the core layer is deep-drawn by moving the first mould part towards its moulding position so that wrinkles are formed in the core layer, the formation of said wrinkles being enhanced by moving the second mould part later and/or more slowly than the first mould part towards its moulding position.

Due to the fact that the second mould part is moved later and/or more slowly than the first mould part towards its moulding position, the core material is little or not hampered by the second mould part from being drawn towards the deep-drawn area so that more wrinkles are formed and, importantly, so that less cracks, tears or breaks are formed in the core material which may weaken the sandwich structure. Due to the fact that the core material is compressible, the wrinkles can be compressed at the location of the deep-drawn area by the first mould part and, adjacent to the deep-drawn area, by the other mould part or parts so that they do not have an effect on the final shape of the sandwich structure. Moreover, in contrast to cracks, tears or breaks, at the location of which the layers of covering material are no longer supported to be kept at a distance from one another, the compressed wrinkles were found not to affect the strength of the sandwich structure since at the location of such wrinkles or pleats, more covering material is present (when the covering material is applied onto the core material before the moulding process) and a portion of this covering material is still present near the surfaces of the sandwich structure. The amount of covering material required to cover the core layer can however be reduced by applying the covering material on the core layer after having moulding this core layer.

In a preferred embodiment of the process according to the invention, the covering material comprises on at least one main face of the core layer a mouldable material.

At least during the moulding process this mouldable material is in the form of a liquid or a kneadable or viscous paste so that the surface of the sandwich structure formed by the mouldable material covering the core layer will correspond to the mould surface. The mouldable material can be applied in this liquid or pasty form (for example in case of a curable composition) or it may require some heating to melt so as to form a liquid or a kneadable of viscous paste (for example in case of a thermoplastic material).

The mouldable material can be applied onto the core layer either before or after having moulded this core layer in the compression mould. When it is applied after having moulded the core layer, the core layer covered with the mouldable material is preferably moulded again either in the compression mould which was used to mould the core layer or in a further compression mould so that a sandwich structure having exactly the desired shape and dimensions (in particular the required thickness) is obtained.

To increase the strength of the sandwich structure, the covering material preferably comprises a reinforcing material, in particular a fibrous material, such as a glass fibre mat or a glass fibre veil.

Such reinforcing materials enable to achieve a sandwich structure with good mechanical properties and in particular with a good dimensional stability when being subjected to varying temperatures. Preferably, the reinforcing material comprises two permeable layers of fibrous material, the second layer being less permeable or finer than the first, coarser layer. When applying the mouldable material in liquid form onto these layers of fibrous material, the finer layer prevents most of the mouldable material from flowing directly into the core layer so that less mouldable material is required to achieve the required mechanical properties and a qualitative, closed surface and so that a lighter sandwich material can be produced.

In a further preferred embodiment of the process according to the invention, the mouldable material covering the main faces of the core layer comprises a thermoplastic material and/or a curable composition, in particular a curable isocyanate based composition.

By applying heat and pressure, these mouldable materials can easily be moulded and hardened to achieve a shape retaining sandwich structure. When the core layer is made of a cellulose based material, the use of an isocyanate based curable composition as mouldable material offers the advantage of adhering quite well to the core layer.

The core layer itself is preferably made of a honeycomb material which offers a higher resistance against compression forces and shear stresses than for example corrugated paperboard so that the covering material, in particular the reinforcing material, is better maintained near the surface of the sandwich structure and so that also the final mechanical properties of the sandwich structure are improved.

Other particularities and advantages of the invention will become apparent from the following description of some particular embodiments of the process according to the present invention. The reference numerals used in this description relate to the annexed drawings wherein:

DETAILED DESCRIPTION OF THE INVENTION

In the method illustrated in the figures, a three-dimensionally shaped sandwich structure is made starting from a layered material 1. This layered material comprises a core layer 2, the two main surfaces of which are each covered with a reinforcing material and with a mouldable material (which may optionally be comprised in one layer). The layered material 1 is moulded in a compression mould wherein the mouldable material is allowed to harden to achieve a shape-retaining sandwich structure. The core layer 2 is a compressible core layer so that, as described further hereinafter, wrinkles which will be formed in the core layer during a first step of the moulding process can be compressed in a subsequent step of the moulding process.

Figure 7:
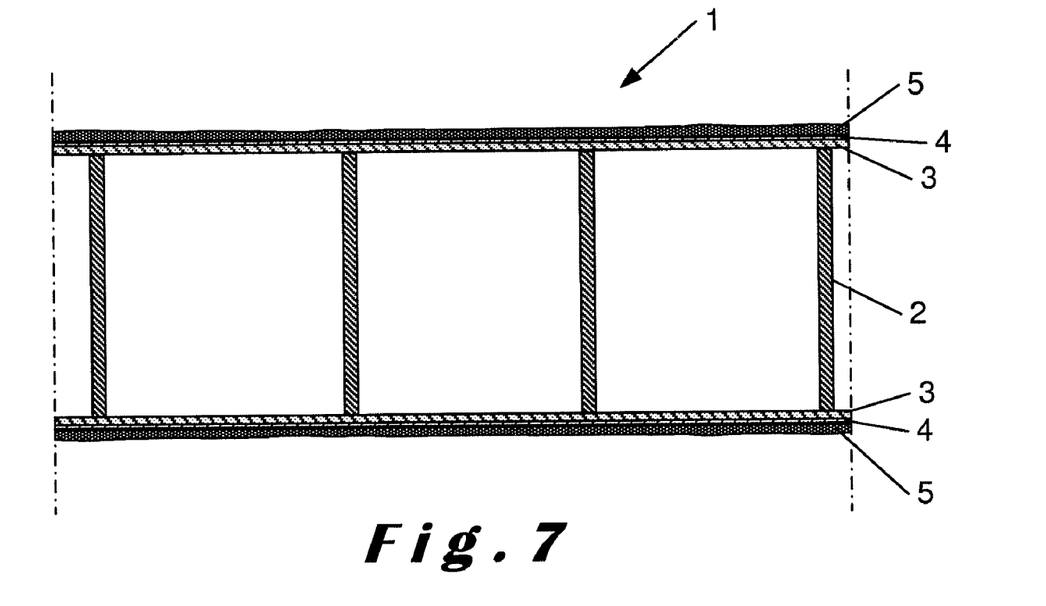
FIG. 7 is a schematic sectional view through the entire layered material comprising, in addition to the layers illustrated in FIG. 6, two layers of a mouldable material sprayed on the outer reinforcing glass fibre layers.

FIG. 7 illustrates an example of a layered material 1 which can be moulded into a three-dimensionally shaped sandwich structure. The layered material 1 comprises a compressible core layer 2, on each side of this core layer a first 3 and a second layer 4 of reinforcing material and on top of the second reinforcing layers 4, a layer 5 of mouldable material.

The reinforcing layer or layers 3 and 4 are preferably layers which contain fibres such as glass fibre mats or finer glass fibre veils, glass fibre non-wovens, glass fibre random structures, glass fibre tissues, chopped or ground glass or mineral fibres, natural fibre mats and knitted or woven fabrics, chopped natural fibres and fibre mats, fibre non-wovens and knitted fabrics based on polymer fibres, carbon fibres of aramide fibres, or mixtures thereof. The reinforcing layer or layers usually also contain a binder, such as a thermoplastic material like polypropylene. The reinforcing layers may be the same on both sides of the core layer or may also be different.

The compressible core layer 2 is intended to keep the reinforcing layers 3, 4 near the surface of the sandwich structure (at the location of the highest tensile stresses) to increase the flexural strength of the sandwich structure. In the final sandwich structure, it is also intended to increase the compression strength of the sandwich structure and preferably also to resist to shear forces which may arise in the sandwich structure. The core layer 2 is therefore preferably made of a relatively rigid or stiff material. A drawback thereof is that such a core layer is substantially non-elastic and also substantially non-stretchable so that it lacks ductility. The core layer 2 can comprise for example a honeycomb material or corrugated paperboard. In view of the cost price, the core layer, in particular the honeycomb material, is preferably made of a cellulose based material. However, the honeycomb material may also be made of aluminium, polyester, polyamide or aramid (Nomex®).

The most preferred core material is a so-called folded honeycomb material disclosed for example in U.S. Pat. No. 6,800,351, which is incorporated herein by reference. Such a folded honeycomb material is made starting from corrugated cardboard, comprising a corrugated paperboard covered on both sides with a sheet of paper. To produce the folded honeycomb structure, the corrugated cardboard is cut alternately on one of its sides in a direction perpendicular to the corrugations. The cuts extend through the corrugated paperboard down to the sheet of paper on the other side so that the corrugated cardboard can be folded along the cuts into a honeycomb structure. An advantage of such a folded honeycomb structure is that it can be produced in a relatively cheap way and that it can be bent in one direction, namely in a direction perpendicular to the cuts (in the other direction it is still stiff), so that it can be moulded easier in accordance with the present invention. Folded honeycomb structures are available in practice under the denomination TorHex cores, which are made from different corrugated boards (A-, CC-, K- or M-Flute) and which have cell sizes ranging from 3.5 to 6.5 mm and heights of between 4 and 12 mm. Of course other honeycomb structures, having other dimensions, can also be produced.

During the production of folded honeycombs, the reinforcing layer or layers can be laminated onto the surfaces thereof in the same production line so that it remains its structure during handling. The reinforcing layer or layers comprise preferably a glass fibre mat or veil containing a thermoplastic binder, which can be laminated onto the honeycomb core by applying some heat and pressure. This thermoplastic material can also function as mouldable material or as part thereof when sufficient heat is applied during the moulding step to soften or melt it.

The mouldable material 5 used to produce the sandwich structure may be contained in the reinforcing layer or layers 3, 4 and may in particular be a thermoplastic material such as polyethylene and polypropylene (in view of their good adherence to thermoplastic materials, such thermoplastic mouldable materials are especially suited when the core layer is also made of a thermoplastic material). When moulding the layered material 1 in the compression mould, heat is applied so that the thermoplastic mouldable material softens or melts. The thermoplastic material is then allowed to harden again before demoulding the obtained shape-retaining sandwich structure.

Instead of, or in addition to the thermoplastic material, the mouldable material 5 comprises preferably a curable composition. Such a curable composition can be hardened more quickly than a molten thermoplastic material and can thus reduce the cycle times. The curable composition may contain for example epoxy, unsaturated polyester, phenolic, polyamide and melamine resins. Preference is however given to a curable isocyanate based composition, in particular a polyurethane, polyurea or polyurea modified polyurethane forming composition. Such compositions can be applied for example by spraying and adhere moreover quite well to cellulose based materials (also polyamides adhere quite well to cellulose based materials). When hardened, more particularly when cured, the mouldable material is preferably a rigid material, more preferably a rigid polyurethane, polyurea or polyurea modified polyurethane material (i.e. a polyurethane material containing urea linkages). To speed up the curing, the mould surfaces are preferably heated to a temperature of between 85 and 130° C.

The mouldable material 5 may comprise a foamable composition which foams in the compression mould. When the reinforcing layer or layers 3, 4 are permeable so that the mouldable material 5 can penetrate into the compressible core layer 2, the foamable composition may fill the core layer 2 substantially completely. An advantage of this embodiment is that the material of the core layer 2 is shielded off from moisture, which is especially advantageous when the core layer is made of a cellulose based material such as paper.

On the other hand, to achieve a stronger sandwich structure, the mouldable material may have a higher density, in particular a density higher than 400 kg/m$^3$ after being moulded, and is mainly located at and near the surface of the sandwich structure. The reinforcing layer or layers 3, 4 are preferably permeable so that the mouldable material may penetrate somewhat in the core layer to achieve a good adhesion between the core layer 2 and the reinforcing layer or layers 3, 4. The reinforcing layer or layers 3, 4 preferably only show small holes or pores to reduce the amount of mouldable material required to achieve a qualitative, more particularly a closed surface and good mechanical properties. It has been found that a minimum of mouldable material is required when using, as reinforcing material, a combination of two permeable layers of fibrous material, more particularly a first heavier and more permeable layer and a second lighter and less permeable layer of fibrous material. The first layer 3 comprises for example a glass fibre mat, having a weight of at least 70 g/m$^2$, whilst the second layer 4 comprises for example a glass fibre veil having a weight smaller than 70 g/m$^2$. The first layer 3 ensures a relatively high amount of reinforcing fibres (contained in thicker yarns) without absorbing a lot of mouldable material whilst the second layer 4 ensures that less mouldable material is needed to achieve a closed surface.

To protect the core layer against moisture, it can be treated with one or more water repellent agents such as waxes and/or such water repellent agents can be added to the reinforcing and/or especially to the mouldable material. It is also possible to cover one or both main faces of the core layer with a water impermeable foil, in particular with a thermoplastic foil such as a thermoplastic polyurethane (TPU) foil. Such a foil may be highly stretchable so that it will not tear during the moulding process. The water impermeable foil is preferably positioned onto the layer of mouldable material 5 so that it is adhered by this mouldable material to the core layer, more particularly to the reinforcing layers applied thereon. The core layer can also be protected against moisture by treating the three-dimensionally shaped sandwich structure, after the production thereof, with a water repellent agent, for example by a coating, spraying or dipping process.

Figure 6:
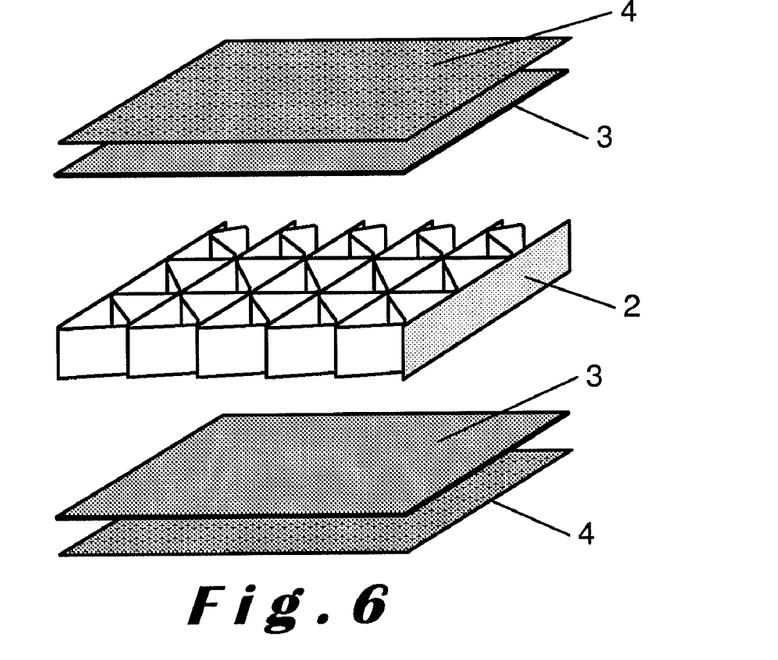
FIG. 6 is a schematic perspective view of the honeycomb core layer and of the reinforcing glass fibre layers of the layered material moulded in the method illustrated in the previous figures.

For producing the three-dimensionally shaped sandwich structure, the layered material 1 comprising, as described hereabove, the core layer 2 having both main faces covered with at least one reinforcing material 3, 4 and with at least one mouldable material 5, is provided. The core layer 2 may for example comprise a folded honeycomb structure 2. During the production of this honeycomb structure 2, a first layer of a fibrous material, more particularly a glass fibre mat 3, may already have been laminated onto the honeycomb structure. When manufacturing the sandwich structure, a second layer of fibrous material, more particularly the glass fibre veil 4, is preferably applied onto the first layer 3, after which the mouldable material 5 is applied. This material is preferably a curable isocyanate based composition which can be sprayed for examples on both sides of the honeycomb structure. During this spraying step, the honeycomb material can be maintained (clamped) in a frame so that it is easier to handle, in particular by means of a robot.

Figure 1:
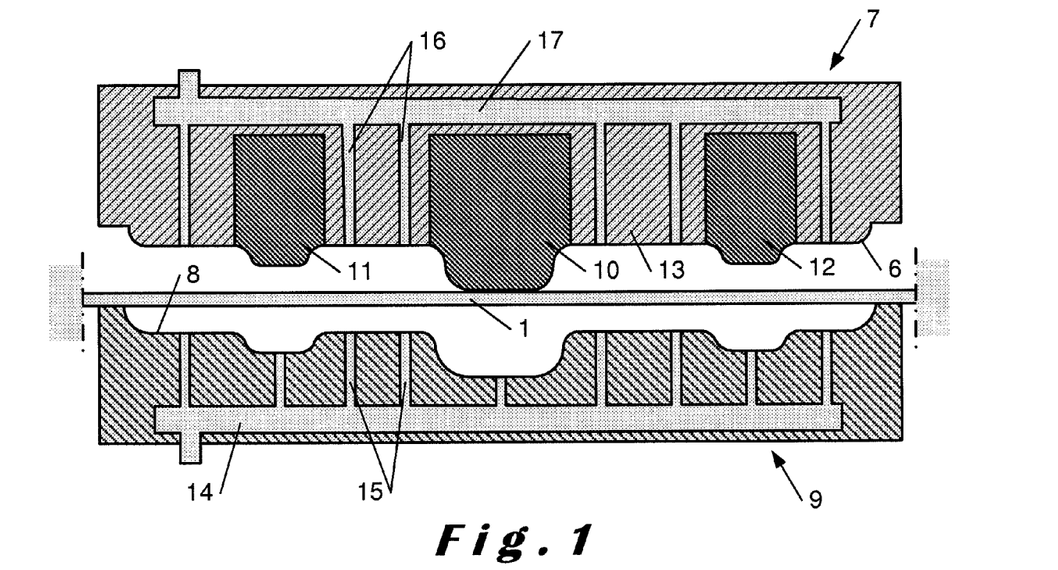
FIG. 1 is a simplified vertical sectional view showing a compression mould wherein a layered material comprising a core layer covered with layers of a reinforcing and of a mouldable material is positioned, in a first manufacturing step, between the upper and the lower mould section to produce a three-dimensionally shaped sandwich structure.

In the next step, illustrated in FIG. 1, the layered material 1 is positioned in a compression mould and the frame (not illustrated) is removed so that the layered material can deform during the moulding process. In the compression mould, the layered material 1 is situated between a first mould surface 6, formed by a first mould section 7, and a second mould surface 8, formed by second mould section 9. The two mould sections 7, 9 are movable with respect to one another between a moulding or closed and a demoulding or open position. Usually, the upper mould section 7 will be movable whilst the lower mould section 9 will be fixed.

An essential feature of the process according to the invention is the construction of the compression mould and the way wherein at least the core layer 2, optionally covered with the covering material, is moulded therein. The first or upper mould section 7 of the compression mould illustrated in the figures is more particularly composed of at least a first 10 and a second mould part which are movable with respect to one another. In the embodiment illustrated in the figures, the second mould part is in its turn composed of mutually movable subparts, more particularly of two first subparts 11, 12 and of a second subpart 13. As can be seen in FIGS. 1 to 5, the second subpart 13 forms in fact the basic part of the first mould section 7 whilst the other parts of the first mould section, namely the first mould part 10 and the first subparts 11 and 12, are movably mounted onto the basic part 13 of the first mould section 7 and are formed more particularly by movable blocks which can be moved between an extended and a retracted position. This can be done by mechanical, pneumatic or preferably by hydraulic actuating means which have however not been illustrated in the figures.

Figure 2:
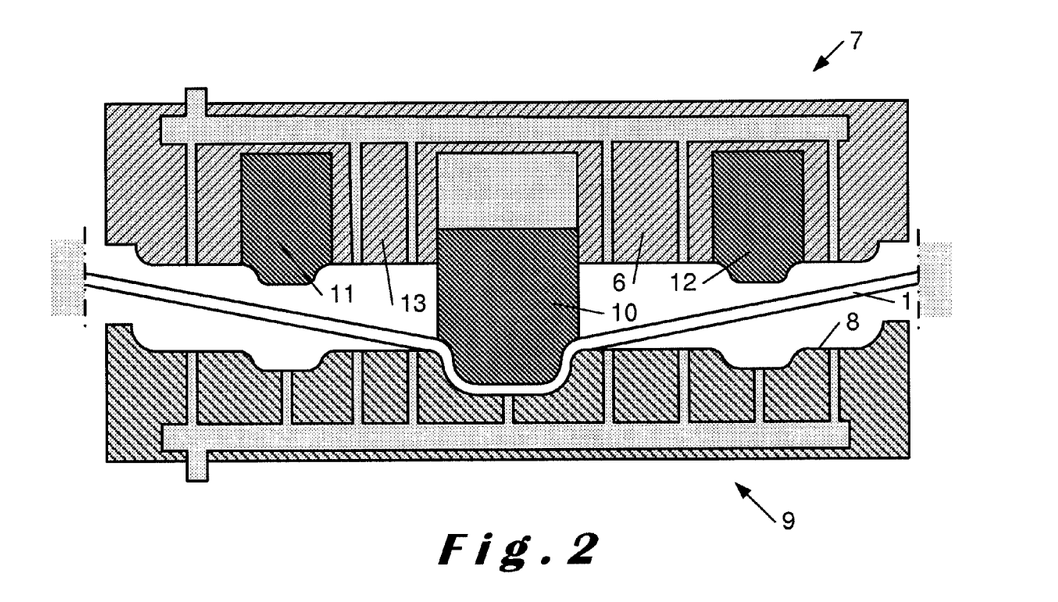
FIG. 2 illustrates the second manufacturing step wherein a first part of the upper mould section is lowered towards the lower mould section to deep-draw a first portion of the layered material.

In the first moulding step, illustrated in FIG. 2, the first mould part 10 is moved towards its moulding position so that a first portion of the layered material 1 comprising the core layer 2 is deep-drawn between the mould surface of the first mould part 10 and the mould surface 8 of the second mould section 9. During this deep-drawing step, wrinkles are formed in the layered material 1 due to the mechanical properties thereof. In this step, the first mould part 10 is preferably lowered to its final moulding position but it is also possible that some further movement of the first mould part 10 towards the second mould section will be needed to reach its final moulding position. It is clear that in this step, and also in the following steps, the first mould section 7 has to be moved sufficiently close to the second mould section 9, i.e. the mould has more particularly usually to be partially closed, to enable the first mould part 10, and in the next step the first subparts 11 and 12, to reach their moulding position in their extended position.

An advantage of first deep-drawing a portion of the core layer 2 by means of the first mould part 10 before moving the second mould part towards its moulding position is that the core layer 2 is little or not hampered by the second mould part to be drawn towards the deep-drawn portion. As a result thereof, it has been found that more wrinkles, and thus less cracks, tears or breaks, will be formed in the core layer 2 of the layered material 1.

Figure 3:
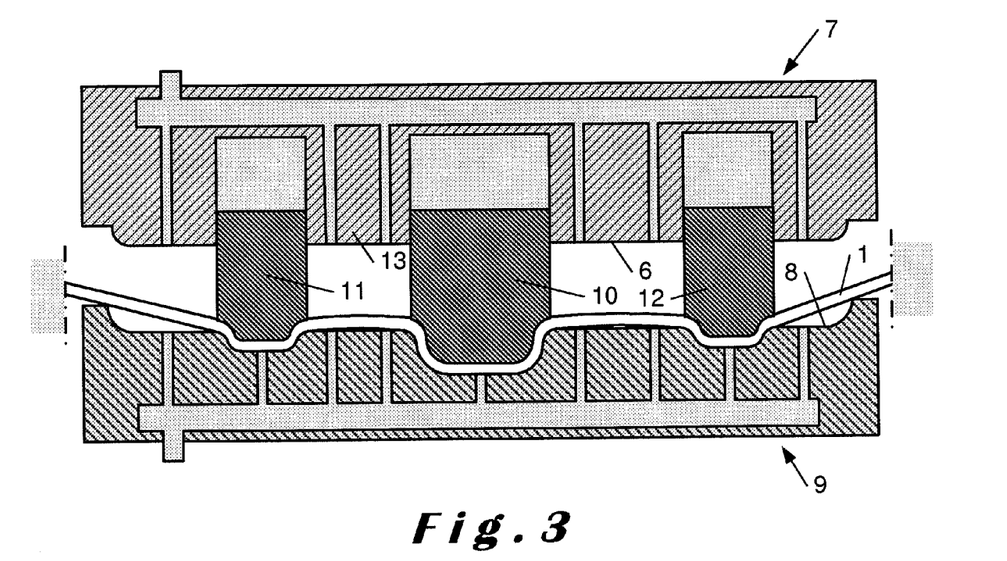
FIG. 3 illustrates the third manufacturing step wherein two further parts of the upper mould section are lowered towards the lower mould section to deep-draw two further portions of the layered material.

In the next moulding step, illustrated in FIG. 3, the first subparts 11 and 12 are moved towards their moulding position so that further portions of the layered material 1 are deep-drawn between the mould surfaces of these first subparts 11 and 12 and the mould surface 8 of the second mould section 9 and so that further wrinkles are formed in the layered material 1. When some of the wrinkles formed by the first mould part 10 extend in the portion of the layered material which is deep-drawn by one of the first subparts 11 or 12, it is possible that some of these wrinkles may disappear again at least partially whilst others are compressed.

In the process illustrated in the figures, the first subparts 11 and 12 are moved simultaneously towards their moulding position. In fact, since they are situated on opposite sides of the first mould part 10, the formation of wrinkles cannot be further enhanced by moving them successively towards their moulding positions. However, when they would be situated on the same side of the first mould part 10, it is clear that the first subpart 11 or 12 which is situated closer to the first mould part 10 should best be moved first towards its moulding position, and subsequently the other first subpart, so that the formation of the further wrinkles would be enhanced. In this situation, the first mould part which is moved first to the second mould section 9 could be the extendible part 11, after which the extendible parts 10 and 12 could be moved successively towards the second mould section 9. A skilled person can quite easily determine the best succession of these movements to optimise the prevention of cracks and tears. In general, he should start with the most central part or with the part which causes the deepest deformation of the layered material.

Figure 4:
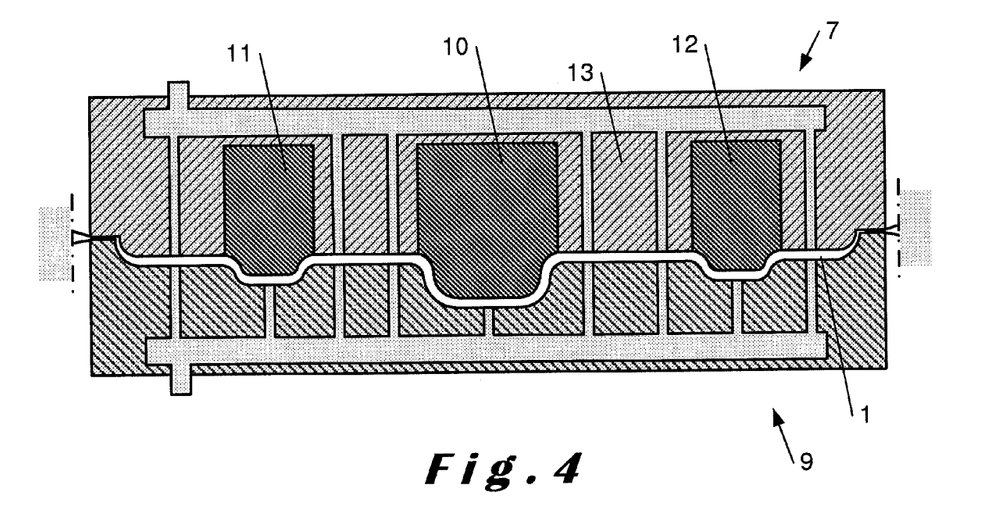
FIG. 4 illustrates the fourth manufacturing step wherein the main part of the upper mould section is lowered towards the lower mould section to mould the layered material between the upper and the lower mould section.

In the next moulding step, illustrated in FIG. 4, the second subpart 13, i.e. the basic upper mould part, is moved towards its moulding position so that the layered material 1 is moulded into its final three-dimensional shape. Any wrinkles in the portion of the layered material situated between this second subpart 13 and the second mould surface 8 will now be compressed, the large wrinkles more particularly into pleats. At the location of such pleats, three layers of core material will be situated on top of one another. The core material can preferably be compressed to a thickness smaller than one third of its thickness so that it can be compressed, at the location of pleats, to at least the original thickness of the core material.

When moving the basic upper mould part 13 towards the lower mould section 9, the extendible mould parts 11, 12 and 13 are moved back towards their retracted positions. This can be achieved for example easily by the pressure exerted by the lower mould section 9 onto these movable parts when releasing the actuating mechanisms of the movable parts, for example when releasing the hydraulic pressure of the hydraulic actuating mechanism.

Figure 5:
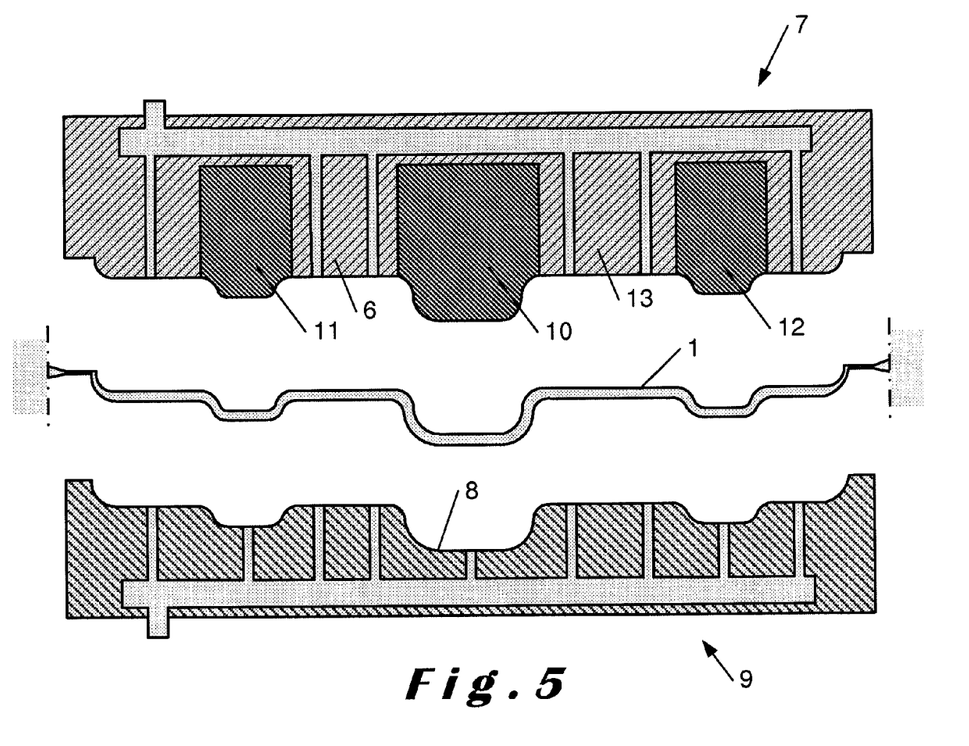
FIG. 5 illustrates the fifth manufacturing step wherein the whole upper mould section of the compression mould is raised to enable to demould the produced sandwich structure.

After the mouldable material 5 has been allowed to harden so that the moulded layered material remains its shape, the whole upper mould section 7 is raised, as illustrated in FIG. 5, to its demoulding position and the produced three-dimensionally shaped sandwich structure is removed from the mould.

In the above described embodiment, the different parts 11 to 13 were moved towards the lower mould section after the previously moved part has reached its moulding position (the simultaneously moved parts can be considered as one part). However, it is also possible to start moving these parts already when the previously moved part has not yet reached its final moulding position. In case the parts are moved at different speeds, it is even possible to start moving the different parts at the same time since they will arrive at different times at their moulding positions.

In the embodiment illustrated in FIGS. 1 to 5, the mould surface portions of each of the movable parts 10 to 13 are generally convex whilst the corresponding mould surface portions of the second (lower) mould section 9 are generally concave. However, it is also possible, but less preferred, to provide one or more of the movable parts at such a location in the first (upper) mould section 7 that the portions of the mould surface defined by these parts are generally concave whilst the corresponding mould surface portions of the second mould section 9 are generally convex. Moreover, it is possible to compose also the second mould section 9 of at least two mutually movable parts, more particularly in the same way as described hereabove for the first mould section 7.

In order to increase the ductility of the layered material somewhat in the above described process, the layered material is treated with steam during the moulding process. This steam is blown via a steam chamber 14 and subsequently through steam channels 15 in the second (lower) mould section 9 into the mould cavity. The steam is removed via suction channels 16 ending in a vacuum chamber 17 in the first (upper) mould section 7. When a curable composition is used as mouldable material 5, the steam treatment accelerates the curing (hardening) of the mouldable material 5.

In the process according to the present invention, use is preferably made of superheated steam, in particular when the core layer 2 is made of a material which absorbs moisture such as a cellulose based material. In this way the ductility of the core layer can be improved somewhat without requiring a separate drying process and without deteriorating the mechanical properties of the core layer. Superheated steam can be defined as steam that has been heated to a higher temperature than the saturation temperature corresponding to its pressure.

In a variant of the method illustrated in the figures, it is possible to mould first the core layer 2 covered with the reinforcing materials, more particularly with the glass fibre mats 3 and with the glass fibre veils 4, in the compression mould 7, 9. It has been found that after the moulding step, the core layer (made of cellulose based honeycomb material) and the covering layers 3 and 4 maintained generally their shape, especially when superheated steam was used so that the core layer quickly regains its mechanical properties when opening the mould. In a next step, the mouldable material 5 can then be sprayed onto both sides of the moulded core layer and the whole can be moulded again in the same compression mould 7, 9, or in another compression mould. During this second moulding step, it is no longer necessary to mould the different portions of the layered material successively by sequentially lowering the different mould parts 10 to 13 but the upper mould section 7 can be lowered as a whole since the layered material 1 forming the sandwich structure is already generally formed.

In case the covering layer or layers comprise a sheetlike material which is substantially not stretchable, such as for example the glass fibre mats or veils, these sheetlike materials are preferably moulded together with the core layer. However, it is also possible to mould only the core layer in the first moulding process. When the core layer is made of a thermoplastic material, it can easily be moulded as such in the first moulding process. Also when the core layer is made of a cellulose based material such as paper, it has been found that it can also be moulded so that it generally retains its three-dimensional shape, especially when treating the core layer with superheated steam during the moulding process. Substantially non-stretchable sheetlike covering layers comprising a fibrous material as reinforcing material are difficult to be applied onto a three-dimensionally moulded core layer. When the reinforcing material comprises a fibrous material, this material is therefore preferably applied in the form of loose fibres, which can for example be sprayed together with the mouldable material onto the moulded core layer.

As described hereabove, wrinkles or even pleats are formed in the core layer during the moulding process so that a complex three-dimensionally shaped sandwich structure having good mechanical properties can be produced. The core layer can be deep-drawn in particular to such an extent during the moulding process that, due to the formation of the wrinkles, the core layer has in the produced sandwich structure an areal weight which is at least 5%, preferably at least 10%, higher than the areal weight of the core layer before the moulding process (i.e. of the flat core layer).

EXAMPLE 1

A three-dimensionally shaped sandwich structure was made starting from a commercially available TorHex core (folded honeycomb structure made of cardboard). The TorHex core had a thickness of 5 mm, a cell size (=thickness of the corrugated cardboard from which it is produced) of 5 mm, a density of 72 kg/m$^3$, a compression strength of 0.6-0.8 N/mm$^2$ and a weight of 360 g/mm$^2$. A glass fibre mat of 100 g/m$^2$ was laminated on both sides of the TorHex core (by means of the thermoplastic binder contained in the glass fibre mat).

During the actual production process of the three-dimensionally shaped sandwich structure, two glass fibre veils of 30 g/m$^2$ were further applied onto the TorHex core, one on each side, and both sides where then sprayed with a curable polyurethane composition, namely with 270 g/m$^2$ of a mixture of Daltorim EH18360 and Suprasec 5030 (MDI). This is a high density formulation which penetrated only to a small extent in the core layer.

The layered material was positioned in a compression mould shaped to produce an inner door panel for an automobile. Before closing the compression mould a first and subsequently a second movable mould part were extended to deep-draw each time a portion of the layered material. Superheated steam, having a temperature of 130° C. was injected in the mould at a pressure of 2 bars during the moulding process. The mould surfaces were moreover heated to a temperature of 110° C.

The produced three-dimensionally shaped sandwich structure had a total weight of 1350 g/m². The areal weight of the part was higher then the theoretical 1160 g/m² due to the pleats formed during the moulding process. It had a good flexural strength, more particularly a flexural strength corresponding to the strength of a same door panel made of solid PUR impregnated natural fiber mat and having a weight of 1800 g/m². In the deep-drawn portions, the honeycomb core layer was kept intact compared to a sandwich structure, which was prepared in identically the same way, except that the compression mould was closed as a whole, i.e. without first extending the movable mould parts.

EXAMPLE 2

Example 1 was repeated except that a layered material, comprising the TorHex core, having a weight of 360 g/m², the attached glass fibre reinforcement layers, having a weight of 100 g/m², and the glass fibre veils, having a weight of 30 g/m², were pre-formed using the same moulding process but without spraying the polyurethane. Also here superheated steam, having a temperature of 130° C. was injected in the mould at a pressure of 2 bars during the moulding process. The in this way pre-formed layered material had sufficient rigidity to keep its shape after demoulding. Afterwards the curable composition was sprayed in an amount of only 200 g/m² on each side of the pre-formed layered material and the layered material was moulded again in the same compression mould. Since the core layer was already shaped, the compression mould was closed in one step. After the curing of the curable composition the sandwich structure was removed from the mould. The sandwich structure had an areal part weight of only 1100 g/m² whereas the theoretical areal weight should be 1020 g/m². This shows there can be an extra weight saving by pre-forming the material stack as less polyurethane is sprayed into the pre-formed pleats. Performed tests on impact strength, E-modulus, flexural strength, maximum bending force and bending stiffness showed this sandwich structure still had good mechanical properties

EXAMPLE 3

Example 1 was repeated except that the high density Daltorim EH18360-Supracec 5030 curable composition was replaced by a low density curable composition being a mixture of Daltorim EL 17872 and Supracec 5030 in order to further reduce the amount of curable resin. Due to the foaming reaction, the honeycomb core layer, more specifically the core cells, were substantially filled with the cured mouldable material. It was however also noticed that a specific amount of curable resin was absorbed by the porous TorHex core cell walls. As a consequence 300 g/m² of curable resin needed to be sprayed on each side in order to fill the core cells. Due to the foam filling of the core cells mechanical properties even increased, especially towards impact and water absorption properties.

The invention claimed is:
1. A process for the production of a three-dimensionally shaped sandwich structure comprising the steps of:
 providing at least a core layer (2) for the sandwich structure which comprises a compressible core material and has a first areal weight;
 positioning said core layer (2) in a compression mould (7, 9) between a first (6) and a second mould surface (8) thereof, the first mould surface (6) being formed by a first mould section (7) and the second mould surface (8) by a second mould section (9), the first and second mould sections (7, 9) being movable with respect to one another between a moulding and a demoulding position; and
 bringing the mould sections (7, 9) into their moulding position to mould said core layer (2) into a three-dimensional shape between the first and the second mould surfaces (6, 8);
 the core layer (2) having two opposite main faces which are covered before and/or after the moulding step with at least one layer of a covering material (3, 4, 5) to achieve said sandwich structure,
 at least said first mould section (7) being composed of at least two mutually movable mould parts (10 and 11-13), including at least a first (10) and a second mould part (11-13) forming respectively a first and a second portion of said first mould surface (6), and,
 when bringing the mould sections (7, 9) into their moulding position, a first portion of the core layer (2) is deep-drawn by moving the first mould part (10) towards its moulding position so that wrinkles are formed in the core layer (2), the formation of said wrinkles being enhanced by moving the second mould part (11-13) later and/or more slowly than the first mould part (10) towards its moulding position so that the core layer (2) is not hampered by the second mould part (11-13) from being drawn towards the first portion of the core layer (2), wherein no notches are made, so that more wrinkles, but fewer cracks, tears or breaks are formed in the core layer, the core layer being deep-drawn in such a manner during the moulding process that, due to the formation of wrinkles, it has in the produced sandwich structure an areal weight which is at least 5% higher than said first areal weight of the core layer before the moulding process.

2. A process according to claim 1, characterised in that, on at least one main face of the core layer (2), said covering material comprises a reinforcing material (3, 4).

3. A process according to claim 2, characterised in that said reinforcing material (3, 4) comprises a fibrous material.

4. A process according to claim 3, characterised in that said reinforcing material (3, 4) comprises a first (3) and a second permeable layer (4) of a fibrous material, the second layer (4) being less permeable than the first layer (3).

5. A process according to claim 1, characterised in that, on at least one main face of the core layer (2), said covering material comprises a mouldable material (5).

6. A process according to claim 5, characterised in that said mouldable material (5) comprises a thermoplastic material and/or a curable composition.

7. A process according to claim 6, characterised in that said mouldable material (5) comprises a curable isocyanate based composition, in particular a polyurethane, polyurea or polyurea modified polyurethane forming composition.

8. A process according to claim 5, characterised in that said mouldable material (5) comprises a foamable composition.

9. A process according to claim 2, characterised in that, on at least one main face of the core layer (2), said covering material comprises a reinforcing material (3, 4) and a mouldable material (5).

10. A process according to claim 9, characterised in that said mouldable material (5) is made to adhere the reinforcing material (3,4) to said core layer (2).

11. A process according to claim 5, characterised in that at least said mouldable material (5) is applied onto the core layer (2) before the moulding step in said compression mould (7, 9) and is allowed to harden in the compression mould (7, 9) before removing the thus produced three-dimensionally shaped sandwich structure therefrom.

12. A process according to claim 5, characterised in that at least said mouldable material (5) is applied onto the core layer (2) after the moulding step of the core layer (2) in said compression mould (7, 9).

13. A process according to claim 12, characterised in that after having applied the mouldable material (5) onto the moulded core layer (2), the core layer (5) covered with the mouldable material is moulded again either in said compression mould or in a further compression mould.

14. A process according to claim 1, characterised in that said core layer (2) comprises corrugated paperboard or a honeycomb material, the corrugated paperboard or the honeycomb material being preferably made of a cellulose based material.

15. A process according to claim 14, characterised in that said core layer (2) comprises a honeycomb material.

16. A process according to claim 1, characterised in that when moulding the core layer (2) it is treated with superheated steam.

17. A process according to claim 1, characterised in that
said second mould part (11-13) is composed of at least two mutually movable subparts, including at least one first (11, 12) and at least one second subpart (13) forming each a portion of the second portion of the first mould surface (6), and in that,
when moving the second mould part (11-13) towards its moulding position, a second portion of the core layer (2) is deep-drawn by moving the first subpart (11, 12) of the second mould part (11-13) towards its moulding position so that further wrinkles are formed in the core layer (2), the formation of said further wrinkles being enhanced by moving said second subpart (13) later and/or more slowly than said first subpart (11, 12) towards its moulding position.

18. A process according to claim 1, characterised in that at least one main face of the core layer (2) is covered with a water impermeable foil.

19. A process according to claim 1, characterised in that when bringing the mould sections (7, 9) into their moulding position, the first mould part (10) is first moved towards its moulding position and, after the first mould part (10) has reached its moulding position, the second mould part (11-13) is moved towards its moulding position, the first mould part (10) being maintained in particular in its moulding position while the second mould part (11-13) is moved towards its moulding position.

20. A process according to claim 1, characterised in that the core layer is deep-drawn in such a manner during the moulding process that, due to the formation of wrinkles, it has in the produced sandwich structure an areal weight which is at least 10% higher than the first areal weight of the core layer before the moulding process.

21. The process according to claim 18, wherein said water impermeable foil is a thermoplastic foil.

* * * * *